United States Patent
Yousef

(10) Patent No.: US 7,386,044 B2
(45) Date of Patent: Jun. 10, 2008

(54) COMPUTATION OF DECISION FEEDBACK EQUALIZER COEFFICIENTS WITH CONSTRAINED FEEDBACK TAP ENERGY

(75) Inventor: Nabil R. Yousef, Foothill Ranch, CA (US)

(73) Assignee: Broadcom Corporation, Irvine, CA (US)

(*) Notice: Subject to any disclaimer, the term of this patent is extended or adjusted under 35 U.S.C. 154(b) by 690 days.

(21) Appl. No.: 10/956,172

(22) Filed: Oct. 1, 2004

(65) Prior Publication Data

US 2005/0041760 A1 Feb. 24, 2005

Related U.S. Application Data

(63) Continuation-in-part of application No. 10/044,013, filed on Oct. 26, 2001, now Pat. No. 7,027,504.

(60) Provisional application No. 60/322,994, filed on Sep. 18, 2001.

(51) Int. Cl.
*H04B 1/38* (2006.01)
*H04L 5/16* (2006.01)
*H04L 27/10* (2006.01)
*H04L 27/18* (2006.01)

(52) U.S. Cl. ........................ 375/233; 375/232; 375/234; 375/229; 708/322; 708/323

(58) Field of Classification Search ................ 375/233, 375/232, 234, 229, 350; 708/322, 323
See application file for complete search history.

(56) References Cited

U.S. PATENT DOCUMENTS

| | | | | |
|---|---|---|---|---|
| 6,535,554 B1* | 3/2003 | Webster et al. | ............. | 375/233 |
| 7,027,504 B2* | 4/2006 | Yousef et al. | ............... | 375/234 |
| 7,099,409 B2* | 8/2006 | Yousef | ........................ | 375/340 |
| 7,113,540 B2* | 9/2006 | Yousef et al. | ............... | 375/233 |
| 7,230,983 B2* | 6/2007 | Yousef et al. | ............... | 375/232 |
| 7,263,123 B2* | 8/2007 | Yousef | ........................ | 375/233 |
| 2004/0179483 A1* | 9/2004 | Perlow et al. | ............. | 370/278 |
| 2004/0228399 A1* | 11/2004 | Fimoff et al. | ............... | 375/233 |
| 2005/0036541 A1* | 2/2005 | McKown | ..................... | 375/233 |
| 2005/0053129 A1* | 3/2005 | Yousef | ........................ | 375/233 |

* cited by examiner

*Primary Examiner*—Phuong Phu
(74) *Attorney, Agent, or Firm*—Garlick Harrison & Markison; Bruce E. Garlick

(57) ABSTRACT

A Decision Feedback Equalizer (DFE) system includes a DFE and a DFE coefficients processor. The DFE receives an uncompensated signal and operates upon the uncompensated input using DFE coefficients to produce an equalized output. The DFE coefficients processor formulates a channel estimate as a convolution matrix H. The DFE coefficients processor determines a Feed Back Equalizer (FBE) energy constraint based upon the channel estimate. The DFE coefficients processor relates the convolution matrix H to the DFE coefficients in a matrix format equation, the matrix format equation based upon the structure of the DFE, the convolution matrix, an expected output of the DFE, and the FBE energy constraint. The DFE coefficients processor formulates a recursive least squares solution to the matrix format equation and computes the recursive least squares solution to the matrix format equation to yield the DFE coefficients.

20 Claims, 9 Drawing Sheets

COMPUTATION OF DECISION FEEDBACK EQUALIZER COEFFICIENTS WITH CONSTRAINED FEEDBACK TAP ENERGY

CROSS REFERENCES TO RELATED APPLICATIONS

This application is a continuation-in-part of U.S. patent application Ser. No. 10/044,013, filed Oct. 26, 2001, now issued as U.S. Pat. No. 7,027,504, which claims priority to U.S. Provisional Application Ser. No. 60/322,994, filed Sep. 18, 2001, both of which are incorporated herein by reference in their entirety.

FIELD OF THE INVENTION

This invention relates generally to digital communications; and more particularly to linear equalizers.

BACKGROUND OF THE INVENTION

The structure and operation of communication systems is generally known. Many communication systems carry data, e.g., voice, audio, video, file, or other digital data that is sent from a transmitter to a receiver. On the transmitter side, data is first formed into packets. This data may be raw data or encoded data that represents the raw data. Each of these packets also typically includes a header, a known training sequence, and a tail. These packets are then modulated into symbols and the symbols are transmitted by the transmitter and intended for receipt by the receiver. The receiver then receives the symbols and attempts to extract the data that is carried by the symbols.

A "channel" carries the symbols from the transmitter to the receiver. The channel is serviced by a wired, wireless, optical, or another media, depending upon the communication system type. In many communication systems, such as terrestrial based wireless communication systems, satellite based communication systems, cable based communication systems, etc., and the channel distorts the transmitted symbols, from the perspective of the receiver, causing interference between a subject symbol and a plurality of symbols surrounding the subject symbol. This type of distortion is referred to as "inter-symbol-interference" and is, generally speaking, the time-dispersed receipt of multiple copies the symbols caused by multipath. The channel also introduces noise into the symbols prior to their receipt. Each of these concepts is well known.

Equalizers are now generally employed in an attempt to remove channel effects from a received symbol stream. Equalizers are essential building blocks of modern receivers, especially in broadband applications where inter-symbol-interference is a critical problem. Equalizers can be divided into two categories, Linear Equalizers (LEs) and Decision Feedback Equalizers (DFEs). A LE is typically a finite impulse response (FIR) filter, which in general can be viewed as some sort of channel inverse. Linear equalizers suffer from noise enhancement, which can become damaging for low SNR. A DFE does not suffer from noise enhancement as it does not try to invert the channel. A DFE constructs and then cancels a replica of the ISI, which is based on symbol decisions and a channel estimate. The DFE also uses a feed forward equalizer (FFE) to equalize channel pre-echoes. The feedback nature of a DFE makes it vulnerable to error propagation in the feedback equalizer (FBE). The probability of error propagation increases with the energy of the feedback taps. A DFE structure does not suffer from noise enhancement by preventing the FFE from inverting the channel. This is done by setting the decision delay equal to L−1, where L is the number of taps of the FFE.

In a typical equalizer, the channel between the transmitter and the receiver is first estimated based upon the training sequence contained in one or more preambles. Then optimal equalizer coefficients (also referred to as taps and/or tap coefficients for the equalizer) are estimated based upon the channel estimate. The optimal equalizer coefficients are then used by the equalizer in extracting the data from the packet. The optimal equalizer coefficients may also be computed after extraction of the data from the equalized data stream based upon blind channel estimates. Equalizer coefficient generation should be repeated as often as possible, especially in fast varying channel cases, to generate new equalizer coefficients. The received data stream is usually buffered during the period that is required for channel estimation and equalizer coefficient computations. Thus, the preamble (and also actual data) contained in a packet may be used to generate the channel estimate and optimal equalizer coefficients that are employed by the equalizer to extract the data from the packet.

As symbol rates increase and modulation schemes become more complex, equalizers have increasingly greater importance. A critical factor in increasing the effectiveness of these equalizers is the complexity of optimal equalizer coefficient computation. A reduction in this complexity: (1) reduces the memory size required to buffer the received symbol stream sequence during the period required for coefficient computations; (2) allows more frequent uploading of new coefficients thus enabling the equalizer to track fast channel variations; and (3) simplifies the hardware and, resultantly, the die area required for coefficient computation.

FIG. 1A is a block diagram illustrating a discrete time symbol-spaced DFE based channel equalization model 100. The channel equalization model 100 includes a channel 102, a Feed Forward Equalizer (FFE) 104, a Decision block 106, and a Feed Back Equalizer (FBE) 108. An input sequence x(n) is complex, independent, and identically distributed with unit power. Additive noise v(n) is white Gaussian with power spectral density $\sigma_v^2$. Furthermore, the decisions $\tilde{x}(n-\delta)$ are assumed to be correct, and hence equal to $x(n-\delta)$. This assumption makes the design of the FBE 108 and FFE 104 easier, but at the expense of introducing error propagation due to possibly wrong decisions. The FFE 104 function G(z) has length L. The channel (impulse) response vector of the channel h is given in Equation (1) as:

$$h \triangleq \begin{bmatrix} h(0) & h(1) & \cdots & h(N-1) \end{bmatrix} \qquad \text{Equation (1)}$$

The number of coefficients (taps) M of the FBE 108 function B(z) is assumed greater or equal to the channel memory, i.e., M≥N−1. These modeling assumptions are feasible in practice.

In estimating FFE 104 and FBE 108 equalizer coefficients, the goal is to minimize the mean square error quantity of Equation (2).

$$\zeta = E|x(n-\delta) - \hat{x}(n-\delta)|^2, \qquad \text{Equation (2)}$$

Where $\hat{x}(n-\delta)$ is the delayed input signal estimate prior to the Decision block 106. By collecting the coefficients of both G(z) and B(z) into vectors, we can express the received signal $\hat{x}(n-\delta)$ in Equation (3) as:

$$x_n = y_n g - \tilde{x}_n b \qquad \text{Equation (3)}$$

A channel output model defining $y_n$ may be expressed by:

$$y_n = x_n H + v_n \quad \text{Equation (4)}$$

where H is the (N+L−1)×L convolution matrix corresponding to the channel response and expressed as:

$$H = \begin{bmatrix} h(0) & 0 & \cdots & 0 \\ h(1) & h(0) & \cdots & 0 \\ \vdots & \vdots & \ddots & \vdots \\ h(N-1) & h(N-2) & \ddots & h(0) \\ 0 & h(N-1) & \ddots & h(1) \\ \vdots & \vdots & \ddots & \vdots \\ 0 & 0 & \cdots & h(N-1) \end{bmatrix} \quad \text{Equation (5)}$$

In this model, $x_n$ is the 1×(N+L−1) input vector:

$$x_n \triangleq [x(n) \; x(n-1) \; \cdots \; x(n-N-L+2)] \quad \text{Equation (6)}$$

$y_n$ is the 1×L input regression vector to the FFE 104, $$y_n \triangleq [x(n) \; x(n-1) \; \cdots \; x-y(n-L+1)] \quad \text{Equation (7)}$$

$\check{x}_n$ is the 1×M input regression vector to the (strictly causal) FBE 108, $$\check{x}_n \triangleq [x(n-\delta-1) \; x(n-\delta-2) \; \cdots \; x(n-\delta-M)] \quad \text{Equation (8)}$$

and $v_n$ is the 1×L vector noise process.

The current efficient methods for computing the optimal filter coefficients of a decision feedback equalizer, which optimizes (1), are based on the well-known Cholesky decomposition method (from a finite-dimension problem formulation). Two published papers: (1) N. Al-Dhahir and J. M. Cioffi, "MMSE Decision-Feedback Equalizers: Finite-Length Results," IEEE Trans. on Information Theory, vol. 41, no. 4, pp. 961-973, July 1995; and (2) N. Al-Dhahir and J. M. Cioffi, "Fast Computation of Channel-Estimate Based Equalizers in Packet Data Transmission," IEEE Trans. on Signal Processing, vol. 43, no. 11, pp. 2462-2473, November 1995 provide one procedure for computing optimal DFE settings. These equations are referred to hereinafter as "Al-Dhahir's equations."

Generally speaking, Al-Dhahir's equations, as well as other existent techniques rely on the use of the generalized Schur algorithm for fast Cholesky decomposition of the matrices involved in both the FBE and FFE optimal coefficient setting computations. However, the overall procedures for calculation of the DFE (FBE and FFE) coefficients have the following problems:

1. These procedures require the use of nonstructured recursive equations. These equations are difficult to implement from the perspective of integrated circuit design. In particular, the recursive equations used in Al-Dhahir's DFE tap (coefficient) computer often requires the use of a DSP processor. As is generally known, the use of a DSP processor in a real-time communication system application is severely constricts system throughput.
2. These procedures, in particular Al-Dhahir's equations require a complex tap computer. In other words, they require the use of a relatively large number of complex multiplies.
3. These prior art DFE coefficient computation techniques can be used only for equalizers that use a fixed equalizer delay ($\delta$), which is set to its maximum value L−1, where L is the length of the FFE 104. The prior art techniques cannot use a different delay $\delta$ of the equalizer.

FIG. 1B is a block diagram illustrating a discrete time symbol-spaced LE channel equalization model 150. The LE channel equalization model 150 includes a channel 152 having length N, a LE 154 having length L, and a decision block 156. An input sequence x(n) is complex, independent, and identically distributed with unit power. Additive noise v(n) is white Gaussian with power spectral density $\sigma_v^2$.

A minimization of the Mean Square Error (MSE) across the decision block 156 may be written as:

$$\min_g E|x(n-\delta) - y_n \cdot g|^2 \quad \text{Equation (9)}$$

Denoting $R_y$ as the variance of the input regression vector y, and cross variance $R_{yx(n-\delta)}$, the smoothing problem for this minimization is given by Equation (10) as:

$$g_{opt} = R_y^{-1} R_{yx(n-\delta)}. \quad \text{Equation (10)}$$

A convolution matrix H as defined in Equation (5) may also be assumed for the LE channel equalization model 150. With a vector d defined as a vector of all zeros except for the $\delta^{th}$ element, which is unity, a solution for the coefficients of the LE 154 solution may be written as:

$$g_{opt} = [\sigma_v^2 I + H^* H]^{-1} h^* \quad \text{Equation (11)}$$

Prior art solutions of Equation (11) require matrix inversion. Such matrix inversion requires the greater of $L^3$ or $N^3$ multiplications and cannot be accomplished timely enough to allow a prior art transceiver to compute LE coefficients based upon a channel estimate. Accordingly, prior art techniques for training LEs included: (1) blindly assigning LE coefficients; (2) adapting the LE coefficients to a received preamble, training sequence, or other data; or (3) a combination of both of these techniques. Typically, convergence in training the LE using an iterative training approach, e.g., Least Squares, required a significant number of iterations. Oftentimes, such convergence in training could not be accomplished to meet the requirements of rapidly changing channels.

In choosing to use either a LE or a DFE, a tradeoff between noise enhancement and error propagation must be made. When error propagation is of more concern than noise enhancement, a LE will typically be chosen. When noise enhancement is of more concern than error propagation, a DFE will typically be chosen. However, considerations of noise enhancement and error propagation often change over time in many communication systems. Thus, there is a need in the art for an equalizer that provides the benefits of both the DFE and the LE and that may be operated in differing system conditions.

SUMMARY OF THE INVENTION

In order to overcome the above-cited shortcomings, a Decision Feedback Equalizer (DFE) system constructed according to the present invention includes a DFE and a DFE coefficients processor. The DFE receives an uncompensated signal and operates upon the uncompensated input using DFE coefficients to produce an equalized output. The DFE coefficients processor is operable to formulate a channel estimate as a convolution matrix H. The DFE coefficients processor is also operable to determine a Feed Back Equalizer (FBE) energy constraint based upon the channel estimate. The DFE coefficients processor is further operable to relate the convolution matrix H to the DFE coefficients in a matrix format equation, the matrix format equation based upon the structure of the DFE, the convolution matrix, an expected output of the DFE, and the FBE energy constraint. The DFE coefficients processor is also operable to formulate a recursive least squares solution to the matrix format equation and to compute the recursive least squares solution to the matrix format equation to yield the DFE coefficients.

In determining the FBE energy constraint based upon the channel estimate, the DFE coefficients processor may be operable to estimate a channel profile of the channel estimate, to estimate a Signal to Noise Ratio (SNR) of the channel estimate, to compare the SNR of the channel estimate to an operational SNR to determine a noise characterization of the channel estimate, and to determine the FBE energy constraint based upon the noise characterization of the channel and the channel profile of the channel estimate. The DFE coefficients processor may formulate the FBE energy constraint as a diagonal matrix having a plurality of FBE energy constraint coefficients. In one operational determination, the plurality of FBE energy constraint coefficients is equal valued. In another operational determination, the plurality of FBE energy constraint coefficients is not equal valued.

The DFE coefficients processor may be operable to compute the recursive least squares solution to the matrix format equation to yield the DFE coefficients by first computing a solution to the least squares problem that yields Feed Forward Equalizer (FFE) coefficients of the DFE coefficients. After these computations are complete, the DFE coefficients processor then convolves the FFE coefficients with a convolution matrix that is based upon the channel estimate to yield the FBE coefficients of the DFE coefficients.

The DFE coefficients processor may be operable to formulate the recursive least squares solution to the matrix format equation using a Fast Transversal Filter (FTF) algorithm. In one particular case, the DFE coefficients processor is operable to formulate the recursive least squares solution to the matrix format equation as a Kalman gain solution using a Fast Transversal Filter (FTF) algorithm. The DFE coefficients processor may be operable to formulate the Kalman gain solution using an Array Form Algorithm.

The method of the preset invention may be efficiently used in many communication systems that require the use of equalizers such as mobile wireless receivers, fixed wireless receivers, cable modem receivers, HDTV receivers, etc. to increase the performance of such communication systems. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1A:
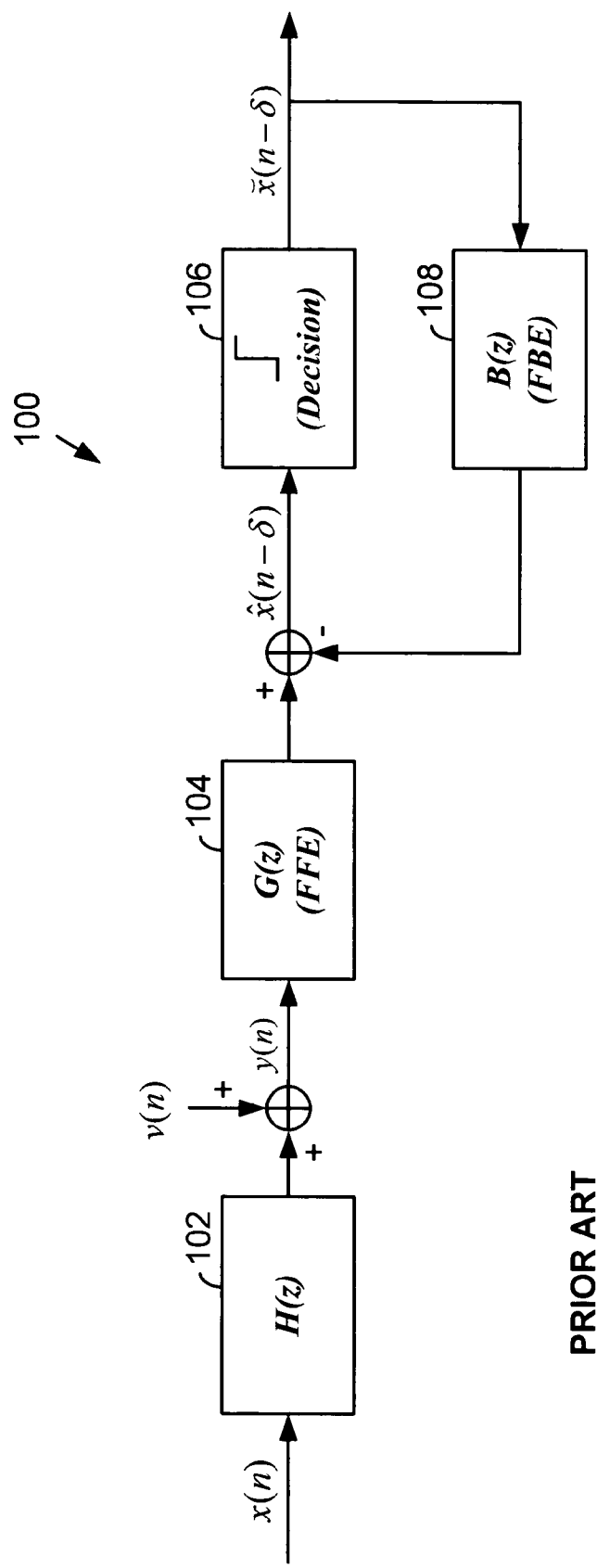
FIG. 1A is a block diagram illustrating a discrete time symbol-spaced Decision Feedback Equalizer (DFE) channel equalization model.
Figure 1B:
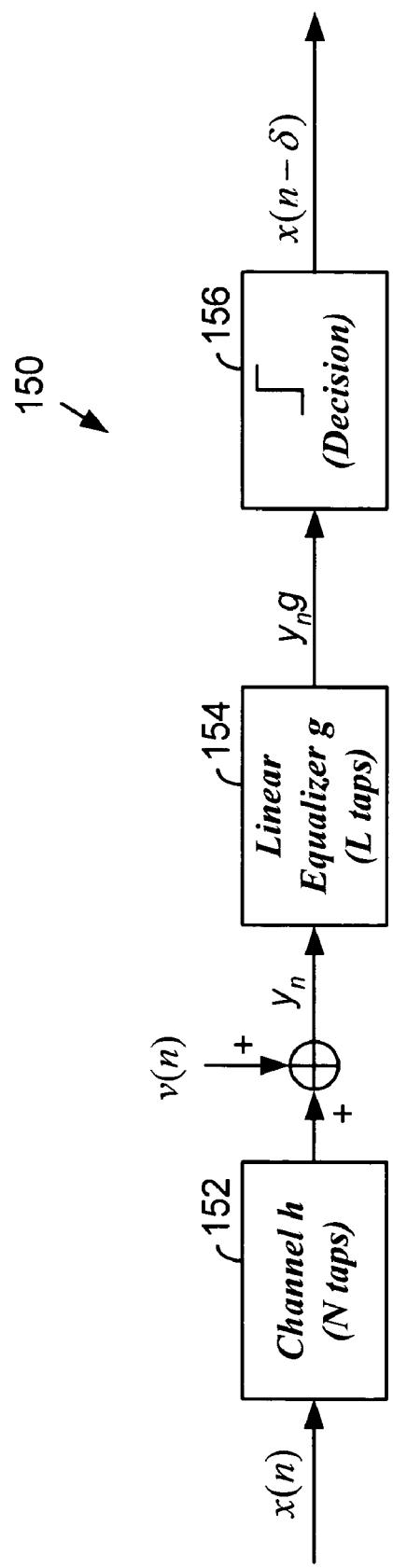
FIG. 1B is a block diagram illustrating a discrete time symbol-spaced Linear Equalizer (LE) channel equalization model.
Figure 2:
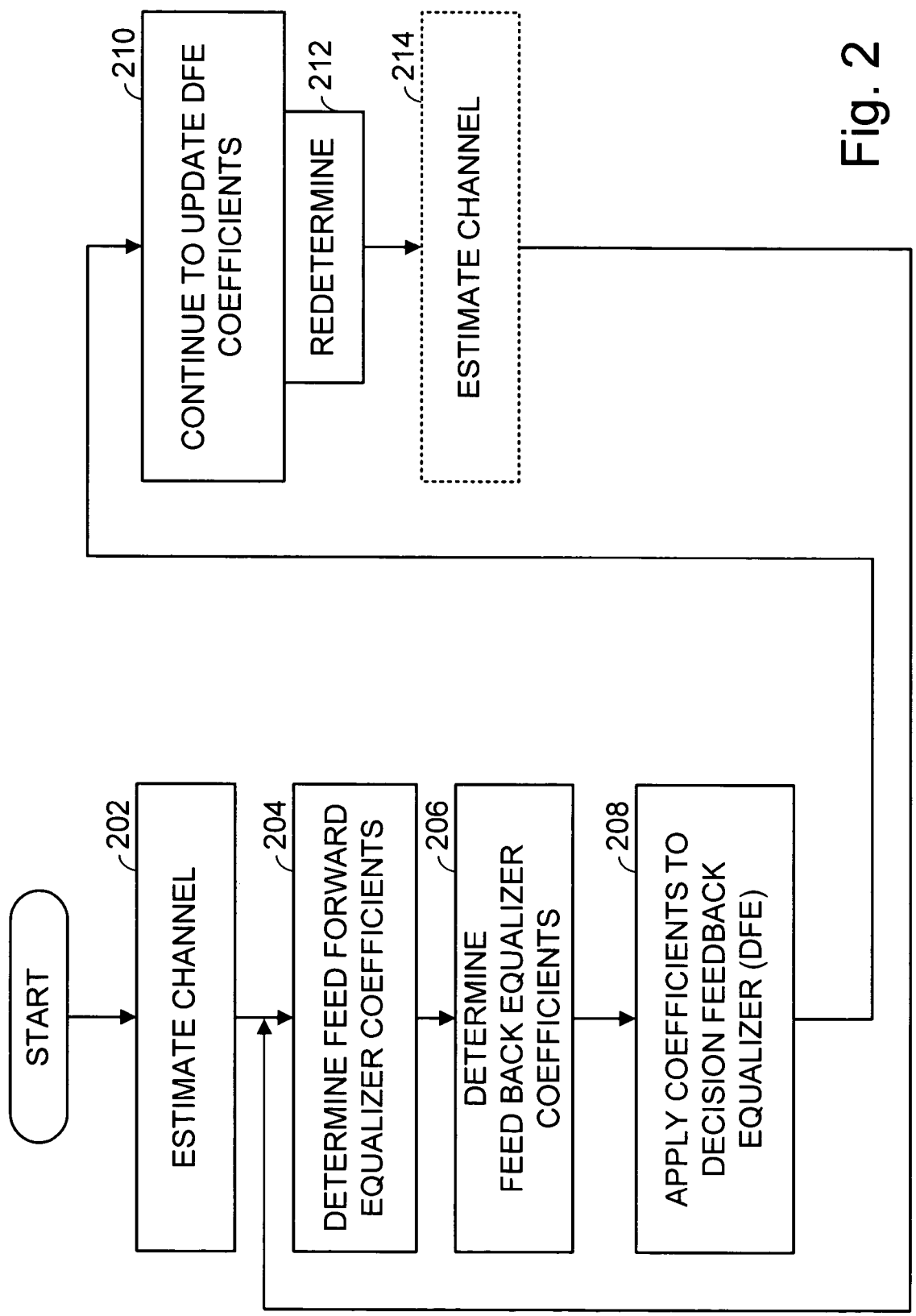
FIG. 2 is a logic diagram generally illustrating operation according to the present invention in determining DFE coefficients and applying such coefficients to a DFE.

FIG. 2 is a logic diagram generally illustrating operation according to the present invention in determining Decision Feedback Equalizer (DFE) coefficients and in applying such coefficients to a DFE. The operations of the present invention are performed by a processor, such as a Digital Signal Processor (DSP), or other circuitry present within a receiver that determines DFE coefficients to be applied to a DFE, also resident in the receiver. The DFE operates upon samples of a received signal in an attempt to remove channel effects from the samples so that digital data may be extracted from the samples. The structure and operation of DFEs, one of which was illustrated in FIG. 1A, are generally known and will not be further described herein except as they relate to the present invention.

The operations of the present invention will be first performed by a processor, tap computer, DSP, or other receiver device, to determine initial DFE coefficients to be used in subsequent operations by the receiver. Thus, during startup or reset, a channel corresponding to the receiver is estimated (step 202). According to one embodiment of the present invention, the channel is estimated based upon a known preamble sequence. However, in other embodiments, the channel could also be estimated based upon unknown received data. In either case, channel estimation operations are generally well known and are not described further herein except as it relates to the present invention.

With the channel estimated, Feed Forward Equalizer (FFE) coefficients are determined based upon the channel estimate (step 206). Then, Feed Back Equalizer (FBE) coefficients are determined based upon the FFE coefficients and the channel estimate (step 208). The manner in which the FFE and FBE coefficients are generated is step 206 and step 208 will be described in detail herein with reference to FIGS. 3-7.

With the FFE and FBE coefficients determined, they are applied to the DFE (step 208) and are used in equalizing samples of a received signal to remove channel effects. These DFE coefficients are continually updated (step 210) using a known technique. Periodically, upon the receipt of a next packet for example, upon an indication that redetermination is required, or upon another triggering event, the DFE coefficients are redetermined (step 212). In this event, another channel estimate may be obtained (step 214). Then, the DFE coefficients are again determined according to the present invention and applied to the DFE. The operations of FIG. 2 continue until the receiver is turned off, placed in a sleep mode, or otherwise inactivated.

Figure 3:
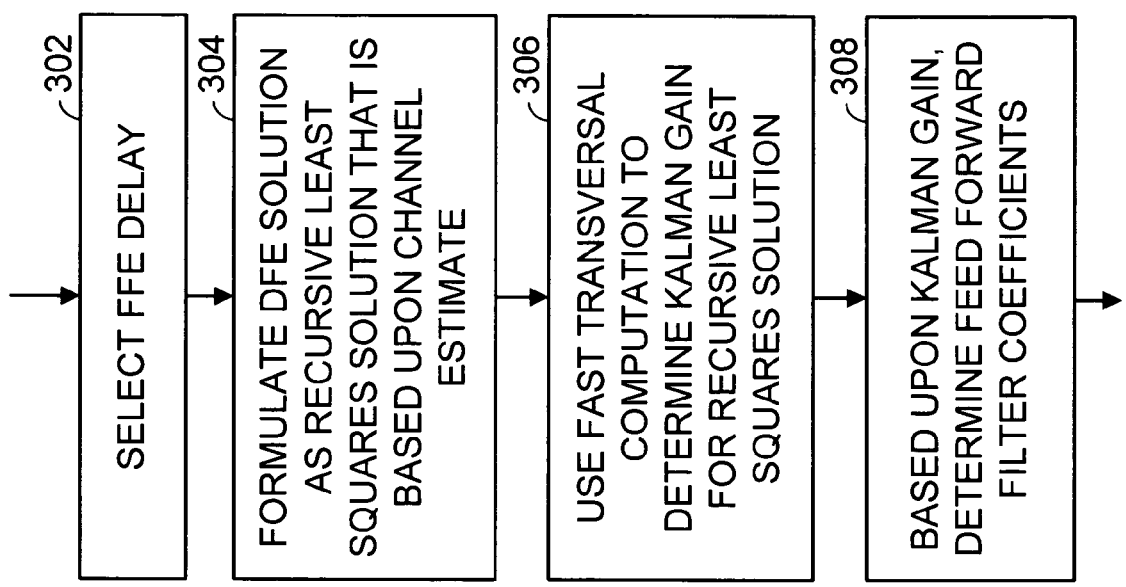
FIG. 3 is a logic diagram illustrating operations according to the present invention employed to determine Feed Forward Equalizer (FFE) coefficients for the DFE.

FIG. 3 is a logic diagram illustrating operations according to the present invention employed to determine Feed Forward Equalizer (FFE) coefficients for the DFE. In a first operation of FIG. 3, a DFE delay is selected (step 302). In one embodiment, this delay is selected as the channel length. In such case, the DFE delay corresponds to the length of the FFE.

Next, the DFE solution is formulated into a least squares solution (step 304). By collecting the FFE coefficients g and the FBE coefficients b into a single vector w, the minimization of the Mean Square Error may be written as:

$$\min_w E\left|x(n-\delta) - \underbrace{[y_n \; -\check{x}_n]}_{u} \underbrace{\begin{bmatrix} g \\ b \end{bmatrix}}_{w}\right|^2 \qquad \text{Equation (12)}$$

Now, denoting $R_u$ the variance of the augmented input regression vector u, and cross variance $R_{ux(n-\delta)}$, the well-known solution to this smoothing problem is given by Equation (13) as:

$$w_{opt} = R_u^{-1} R_{ux(n-\delta)}. \qquad \text{Equation (13)}$$

Where $$R_u \triangleq E\begin{bmatrix} y_n^* \\ -\check{x}_n^* \end{bmatrix}[y_n \; -\check{x}_n] = \begin{bmatrix} R_y & -R_{y\check{x}} \\ -R_{\check{x}y} & R_{\check{x}} \end{bmatrix} \qquad \text{Equation (14)}$$

And $$R_{ux(n-\delta)} = \begin{bmatrix} Ey_n^* x(n-\delta) \\ E\check{x}_n^* x(n-\delta) \end{bmatrix} = \begin{bmatrix} R_{yx(n-\delta)} \\ R_{\check{x}x(n-\delta)} \end{bmatrix} \qquad \text{Equation (15)}$$

Using the channel output model of Equation (4), and the fact that x(n) is individually identically distributed (i.i.d.), the following closed form expressions for $\{R_y, R_{y\check{x}}, R_{\check{x}}, R_{yx(n-\delta)}, R_{\check{x}x(n-\delta)}\}$ are determined:

$$R_y = Ey_n^* y_n = \sigma_v^2 I + H^* H \qquad \text{Equation (16)}$$

$$R_{y\check{x}} = H^*(E\check{x}_n^* \check{x}_n) = H^* \begin{bmatrix} 0_{(\delta+1)\times M} \\ I_M \\ 0_{(N+L-M-\delta)\times M} \end{bmatrix} \triangleq \overline{H}^*, \qquad \text{Equation (17)}$$

$$R_{\check{x}} = I_M \qquad \text{Equation (18)}$$

$$R_{yx(n-\delta)} = H^* E x_n^* x(n-\delta) = H^* [0_{1\times\delta} \; 1 \; 0]^{T\Delta} = h^* \qquad \text{Equation (19)}$$

$$R_{\check{x}x(n-\delta)} = 0 \qquad \text{Equation (20)}$$

Where $\overline{H}$ is a submatrix of H as set forth in Equation (5), $$H = \begin{bmatrix} H_1 \\ \overline{H} \\ H_2 \end{bmatrix} \qquad \text{Equation (21)}$$

Where $H_1$ is defined as the $(\delta+1)\times L$ submatrix of H, consisting of the first $(\delta+1)$ rows of H. Note that for the case of colored noise, the matrix $\sigma_v^2 I$ should be replaced by the autocorrelation matrix of the noise $R_v$. Extending the derivation to the colored noise case is straightforward.

Now, with the quantities defined above, Equation (13) becomes:

$$w_{opt} = \begin{bmatrix} \sigma_v^2 I + H^* H & -\overline{H}^* \\ -\overline{H} & I \end{bmatrix}^{-1} \begin{bmatrix} h^* \\ 0 \end{bmatrix} \qquad \text{Equation (22)}$$

Using the well known inverse formula of block matrices, $w_{opt}$ may be rewritten as:

$$w_{opt} = \left(\begin{bmatrix} 0 & 0 \\ 0 & I \end{bmatrix} + \right. \qquad \text{Equation (23)}$$

$$\left. \begin{bmatrix} I \\ \overline{H} \end{bmatrix} (\sigma_v^2 I + H^* H - \overline{H}^* \overline{H})^{-1} [I \; \overline{H}^*] \right) \begin{bmatrix} h^* \\ 0 \end{bmatrix}$$

And as:

$$= \begin{bmatrix} I \\ \overline{H} \end{bmatrix} (\sigma_v^2 I + H_1^* H_1 + H_2^* H_2)^{-1} h^* \qquad \text{Equation (24)}$$

Which may be written as:

$$\begin{bmatrix} g_{opt} \\ b_{opt} \end{bmatrix} = \begin{bmatrix} I \\ \overline{H} \end{bmatrix} \left(\sigma_v^2 I + [H_1^* \; H_2^*]\begin{bmatrix} H_1 \\ H_2 \end{bmatrix}\right)^{-1} h^* \qquad \text{Equation (25)}$$

Although each of the two matrices $H_1$ and $H_2$ has a shift structure, the augmented matrix $$\begin{bmatrix} H_1 \\ H_2 \end{bmatrix}$$

does not have a shift structure.

In selecting the length of the FBE (DFE delay) to be $M \geq N-1$, the quantities $h_\delta$, $H_1$ and $H_2$ are such that:

$$\begin{bmatrix} H_1 \\ H_2 \end{bmatrix} = \begin{bmatrix} H_\delta & 0 \\ 0 & \tilde{H} \end{bmatrix} \qquad \text{Equation (26)}$$

And $$h = [h_\delta \ 0]$$
Equation (27)

This implies that:

$$\sigma_v^2 I + H_1^* H_1 + H_2^* H_2 = \begin{bmatrix} \sigma_v^2 I + H_\delta^* H_\delta & 0 \\ 0 & \sigma_v^2 I + \tilde{H}^* \tilde{H} \end{bmatrix}$$
Equation (28)

Is block diagonal. In this case, the expressions for $g_{opt}$ and $b_{opt}$ decouple into a simple form.

Therefore, the optimal FFE and FBE coefficients are represented as:

$$g_{opt} = (\sigma_v^2 I + H_\delta^* H_\delta)^{-1} h_\delta^*$$
Equation (29)

$$b_{opt} = \overline{H} g_{opt}$$
Equation (30)

The above expressions are valid for all values of the DFE delay δ. In general, the optimal value for the DFE delay δ is within the range $L-1 \leq \delta_{opt} \leq N+L-2$. In the special case of the choice $\delta = L-1$, the matrices involved in the above expressions are given by:

$$H_\delta = \begin{bmatrix} h(0) & 0 & \cdots & 0 \\ h(1) & h(0) & \cdots & 0 \\ \vdots & \vdots & \ddots & \vdots \\ h(N-1) & h(N-2) & \cdots & h(0) \end{bmatrix},$$
Equation (31)

$$h_\delta^* = \begin{bmatrix} h^*(N-1) \\ h^*(N-2) \\ \vdots \\ h^*(0) \end{bmatrix}$$

And $$\overline{H} = \begin{bmatrix} 0 & h(N-1) & \cdots & h(1) \\ 0 & 0 & \cdots & h(2) \\ \vdots & \vdots & \ddots & \vdots \\ 0 & 0 & \cdots & h(N-1) \end{bmatrix}$$
Equation (32)

Note that this solution is equivalent to the solution of Al-Dhahir's equations, due to the uniqueness of $w_{opt}$ when Equation (2) is minimized. However, the expressions obtained above for Equations (29) and (30) provide alternative methods to compute the FFE and FBE coefficients $g_{opt}$ and $b_{opt}$ in a simpler and more efficient way than the prior art techniques.

In calculating $g_{opt}$, a coefficient matrix is first defined in Equation (33) as:

$$P_\delta \triangleq (\sigma_v^2 I + H_\delta^* H_\delta)^{-1}$$
Equation (33)

so that the optimal solution for the FFE coefficients $g_{opt}$ is given by $$g_{opt} = P_\delta h_\delta^*.$$
Equation (34)

The expression for $g_{opt}$ corresponds exactly to the definition of the Kalman gain vector, used to update the optimal weights in a certain regularized Recursive Least Squares (RLS) problem. More specifically, given a (n+1)×L data matrix $H_n$ and the corresponding coefficient matrix $P_n$, the Kalman gain $g_n = P_n h_n^*$ can be time-updated according to the following recursions:

$$\gamma^{-1}(n) = 1 + h_n P_{n-1} h_n^*,$$
Equation (35)

$$g_n = P_{n-1} h_n^* \gamma(n),$$
Equation (36)

$$P_n = P_{n-1} - g_n \gamma^{-1}(n) g_n^*,$$
Equation (37)

Where $P_{-1} = \sigma_v^{-2} I$ (the term $P_{-1}$ is the initial condition for $P_n$) and $g_0 = 0$. The computation of the Kalman gain vector $g_{n+1}$ in the above solution relies on the propagation of the Riccati variable $P_n$. This method of computation requires $O(L^2)$ operations per iteration.

Well known fast RLS schemes avoid the propagation of $P_n$ and compute the gain $g_n$ in a more efficient way. In this case, the computational complexity required is only of $O(L)$ per iteration. This implies that the overall complexity needed to calculate the FFE coefficients can be on the order of $O(L^2)$ thus yielding an efficient method for computing the FFE coefficients. Therefore, fast RLS filters are used to determine $g_{opt}$. In such case, fast transversal computations are employed to determine the Kalman gain for the RLS solution (step 306). Here we also note that it is straightforward to extend this method to use other fast RLS algorithms, e.g., array form fast RLS algorithms.

Faster recursions may be obtained by selecting the FBE length. Such selection eliminates certain variables that remain constant and equal to zero during adaptations in the special solution for $g_{opt}$. Fast RLS recursion in its explicit form propagates $g_n$ in an efficient manner, see, e.g.: [1] Ljung, M. Morf, and D. Falconer, "Fast calculation of gain matrices for recursive estimation schemes," Int. J. Contr. vol. 27, pp. 1-19, January 1978); [2] G. Carayannis, D. Manolakis, and N. Kalouptsidis, "A fast sequential algorithm for least squares filtering and prediction," IEEE Trans. on Acoustic., Speech, Signal Proc., vol. ASSP-31, pp. 1394-1402, December 1983; and [3] J. Cioffi and T. Kailath, "Fast recursive-least-squares transversal filters for adaptive filtering," IEEE Trans. on Acoust., Speech Signal Processing, vol. ASSP-32, pp. 304-337, April 1984.

Table 1 lists the fast recursions employed in one embodiment for computing the normalized Kalman gain. The additional index included in $k_{L,n}$ and $\gamma_L(n)$ stems from the fact that these quantities admit an order-update relation, instead of time-update.

TABLE 1

Fast Transversal Computation of the Kalman gain

Initialization $\zeta^f(-1) = \zeta^b(0) = \sigma_v^2$ $w_{-1}^f = w_0^b = k_0 = 0$ $\gamma_L(0) = 1$

TABLE 1-continued

Fast Transversal Computation of the Kalman gain

For n = 0 to δ repeat operations (1) to (13).

(1) $\alpha_L(n-1) = h(n) - h_{n-1} w_{n-2}^f$ (2) $f(n-1) = \gamma_L(n-1)\alpha(n-1)$ (3) $k_{L+1,n-1} = \begin{bmatrix} 0 \\ k_{L,n-1} \end{bmatrix} + \frac{\alpha*(n-1)}{\zeta^f(n-2)} \begin{bmatrix} 1 \\ -w_{n-2}^f \end{bmatrix}$ (4) $\zeta^f(n-1) = \zeta^f(n-2) + \alpha*(n-1)f(n-1)$ (5) $w_{n-1}^f = w_{n-2}^f + k_{L,n-1} f(n-1)$ (6) $\gamma_{L+1}(n) = \gamma_L(n-1)\frac{\zeta^f(n-2)}{\zeta^f(n-1)}$ (7) $v(n)$ = (last entry of $k_{L+1,n-1}$)

(8) $k_{L,n} = k_{L+1,n-1}(1:L) + v(n) w_{n-1}^b$ (9) $\beta(n) = \zeta^b(n-1) v^*(n)$

(10) $\gamma_L(n) = \frac{\gamma_{L+1}(n)}{1 - \gamma_{L+1}(n)\beta_L(n)v_L(n)}$

(11) $b(n) = \gamma_L(n)\beta_L(n)$

(12) $\zeta^b(n) = \zeta^b(n-1) + \beta^*(n)b(n)$

(13) $w_n^b = w_{n-1}^b + k_{L,n} b(n)$

Set $g_{opt} = k_{L,\delta}\gamma_L(\delta)$.

The purpose of computing $k_n$ in the well-known FTF algorithm is to use it in the computation of the corresponding optimal least squared solution for the FFE coefficients. Because we are interested only in $k_n$, the filtering part of the FTF algorithm is not necessary, and does not appear in the algorithm listing.

The quantities $\{w_n^f, w_n^b\}$ are known as the least-squares solutions of the forward and backward prediction problems of order L, with corresponding residual errors $\{f(n), b(n)\}$. Now, because during the first L iterations, the desired signal for the backward prediction problem is equal to zero, the backward least squares solution $w_n^b$ will be equal to zero. This means that all quantities associated with the backward prediction problems will remain nulls for the first L iterations. Since in our case the optimal solution is achieved exactly at the L-th iteration, we can simply rule out the computation of these quantities from Table 1. These operations correspond to operations (7) and (9) through (13) of Table 1. Note that operation (10) of Table 1 is also eliminated, since $\beta(n)=0$, which implies $\gamma_L(n)=\gamma_{L+1}(n)$. This means that we can replace operation (6) of Table 1 with:

$$\gamma_L(n) = \gamma_L(n-1)\frac{\zeta^f(n-2)}{\zeta^f(n-1)}, \quad \text{Equation (38)}$$

Which can be further simplified since:

$$\gamma_L(n) = \frac{\zeta^f(-1)}{\zeta^f(0)} \frac{\zeta^f(0)}{\zeta^f(1)} \cdots \frac{\zeta^f(n-2)}{\zeta^f(n-1)} = \frac{\sigma_v^2}{\zeta^f(n-1)} \quad \text{Equation (39)}$$

Moreover, operation (8) of Table 1 becomes simply $$k_{L,n} = k_{L+1,n-1}(1:L). \quad \text{Equation (40)}$$

where (1:L) denotes the first L entries of $k_{L+1,n-1}$

Table 2 illustrates a simplified fast recursion for computing the optimal FFE coefficients $g_{opt}$.

TABLE 2

Fast Transversale Computation of the FFE coefficients.

Initialization $\zeta^f(-1) = \sigma_v^2$ $w_{-1}^f = k_{L,0} = 0$ $\gamma(0) = 1$ For n = 0 to δ repeat operations (1) through (7):

(1) $\alpha_L(n-1) = h(n) - h_{n-1} w_{n-2}^f$ (2) $f(n-1) = \gamma_L(n-1)\alpha(n-1)$ (3) $k_{L+1,n-1} = \begin{bmatrix} 0 \\ k_{L,n-1} \end{bmatrix} + \frac{f*(n-1)}{\sigma_v^2} \begin{bmatrix} 1 \\ -w_{n-2}^f \end{bmatrix}$ (4) $\zeta^f(n-1) = \zeta^f(n-2) + \alpha*(n-1)f(n-1)$ (5) $w_{n-1}^f = w_{n-2}^f + k_{L,n-1} f(n-1)$ (6) $\gamma(n) = \frac{\sigma_v^2}{\zeta^f(n-1)}$ (7) $k_{L,n} = k_{L+1,n-1}(1:L)$ Set $g_{opt} = k_{L,\delta}\gamma(\delta)$ With the Kalman gain determined, the FFE coefficients are then determined (step 308). In the recursions of Table 2, the FFE coefficients are determined by setting $g_{opt}=k_{L,\delta}\gamma(\delta)$ when the number of iterations, n, is equal to the DFE delay.

Unlike the conventional weighted FTF algorithm, the above recursions do not face finite precision difficulties for the following reasons. First, by ruling out the equations associated with the backward prediction problem, we are automatically eliminating many of the recursive loops that are responsible for the finite precision difficulties of the full FTF algorithm. Second, these simplified fast recursions have a forgetting factor $\lambda=1$, which yields finite precision stability. Third, the simplified algorithm deals with a finite set of data (δ+1 iterations). This algorithm is then reset, which avoids the accumulation of finite precision errors.

Figure 4:
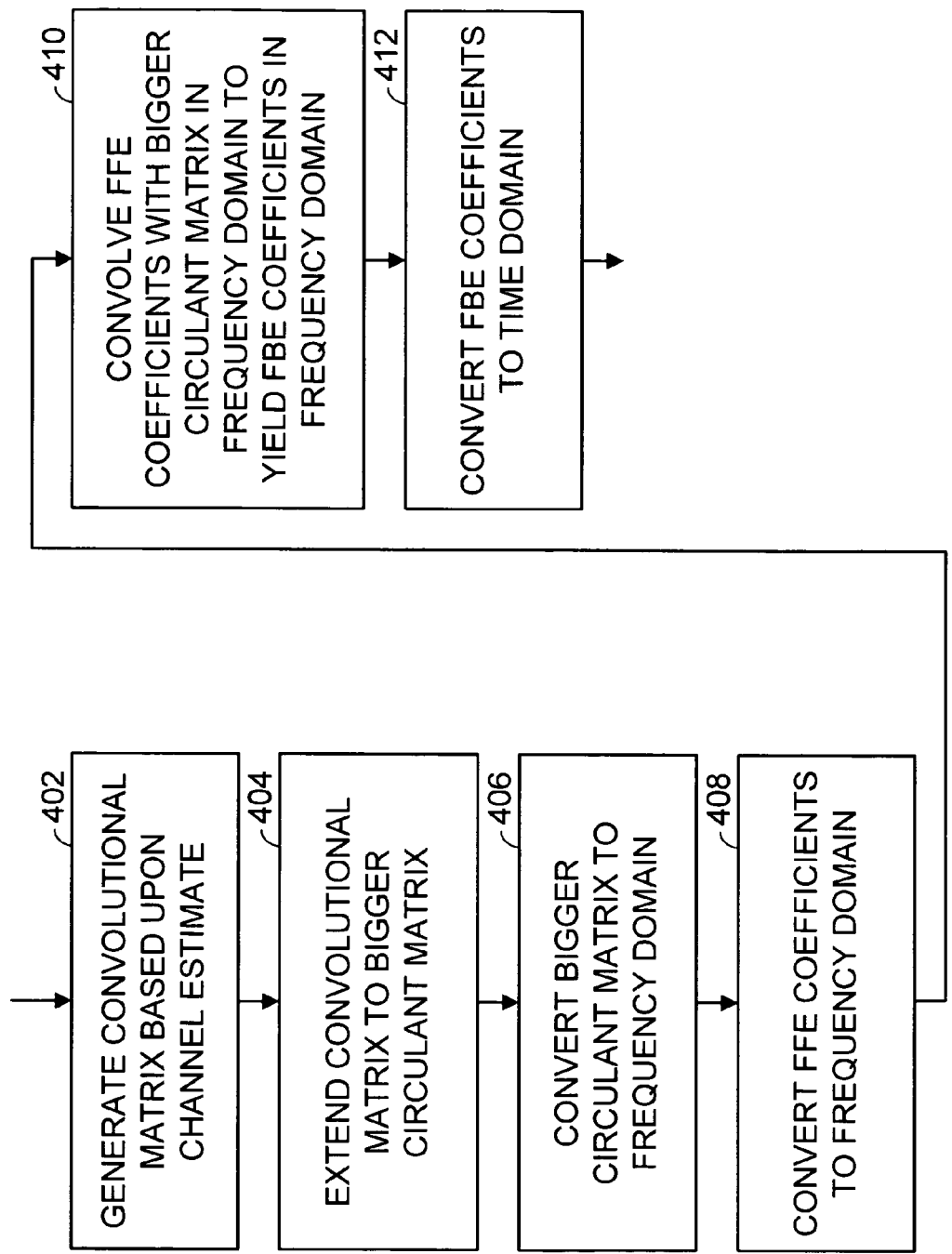
FIG. 4 is a logic diagram illustrating operations according to the present invention employed to determine Feed Back Equalizer (FBE) coefficients for the DFE.

FIG. 4 is a logic diagram illustrating operations according to the present invention employed to determine Feed Back Equalizer (FBE) coefficients for the DFE. The FBE coefficients $b_{opt}$ are determined according to the matrix-vector product of Equation (30). The computation of the feedback filter coefficients simply amounts to convolution of the channel impulse response with $g_{opt}$. The convolution operation that defines the optimal FBE coefficients in Equation (30) can be computed directly with LM/2 multiplications. Alternatively, the operations may also be efficiently performed using well-known fast FFT convolution techniques.

To illustrate such operations, Equation (32) is first rewritten in Equation (41) as:

$$b_{opt} = \begin{bmatrix} I_M & 0 \end{bmatrix} \begin{bmatrix} \overline{H} & H_3 \\ H_4 & H_5 \end{bmatrix} \begin{bmatrix} g_{opt} \\ 0 \end{bmatrix}, \quad \text{Equation (41)}$$

The above equality holds true regardless of the values of $H_3$, $H_4$ or $H_5$. Now, if these values are chosen such that the matrix C, defined by:

$$C = \begin{bmatrix} \overline{H} & H_3 \\ H_4 & H_5 \end{bmatrix}.$$ Equation (42)

Is a square (Q×Q) circulant matrix, where Q is the smallest power-of-two integer larger than or equal M+L. In this case, the matrix C is rewritten in Equation (43) as:

$$C = F^* \Lambda F,$$ Equation (43)

Where F is a (Q×Q) FFT matrix and $\Lambda$ is a diagonal matrix that contains the elements of the FFT of the first row of C. The solution for $b_{opt}$ becomes:

$$b_{opt} = \begin{bmatrix} I_M & 0 \end{bmatrix} F * \Lambda F \begin{bmatrix} g_{opt} \\ 0 \end{bmatrix},$$ Equation (44)

The complexity of this method is the complexity of obtaining the FFT of two vectors of Q elements of each, the inverse FFT of another Q element vector, and Q complex multiples. Thus the overall complexity is $$Q + 3Q\log_2(Q).$$ Equation (45)

For the case of a power-of-two channel estimate N, the complexity is $$2M + 6M \log_2(2M).$$ Equation (46)

Thus, referring again to FIG. 4, in determining the FBE coefficients, the convolutional matrix $\overline{H}$ is first determined (step 402). As was previously described, the matrix $\overline{H}$ may be determined as part of the channel estimation. Then, the convolutional matrix $\overline{H}$ is extended to form the bigger circulant matrix C (step 404). The bigger circulant matrix C is then converted to the Frequency domain (step 406) as are the FFE coefficients (step 408). With both the bigger circulant matrix C and the FFE coefficients in the frequency domain, they are convolved in the frequency domain by simple matrix multiplication (step 410) to produce the FBE coefficients $b_{opt}$. Finally, the resultant FBE coefficients $b_{opt}$ are then converted to the time domain using inverse FFT operations to produce FBE coefficients $b_{opt}$ in the time domain (step 412). The FBE coefficients $b_{opt}$ are then applied with the FFE coefficients $g_{opt}$ to the DFE (as previously described with reference to FIG. 2.

Figure 5:
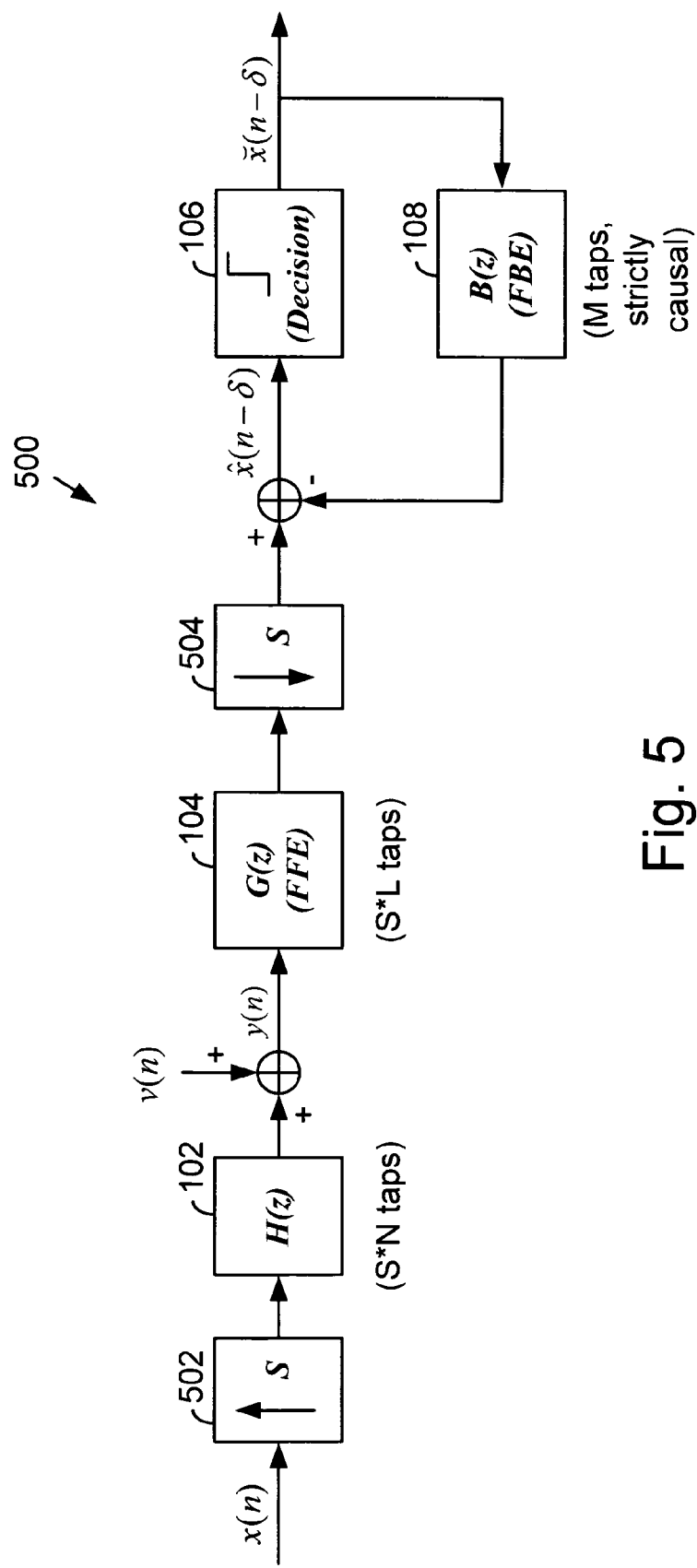
FIG. 5 is a block diagram illustrating a discrete time fractionally-spaced DFE that operates according to the present invention.
Figure 6:
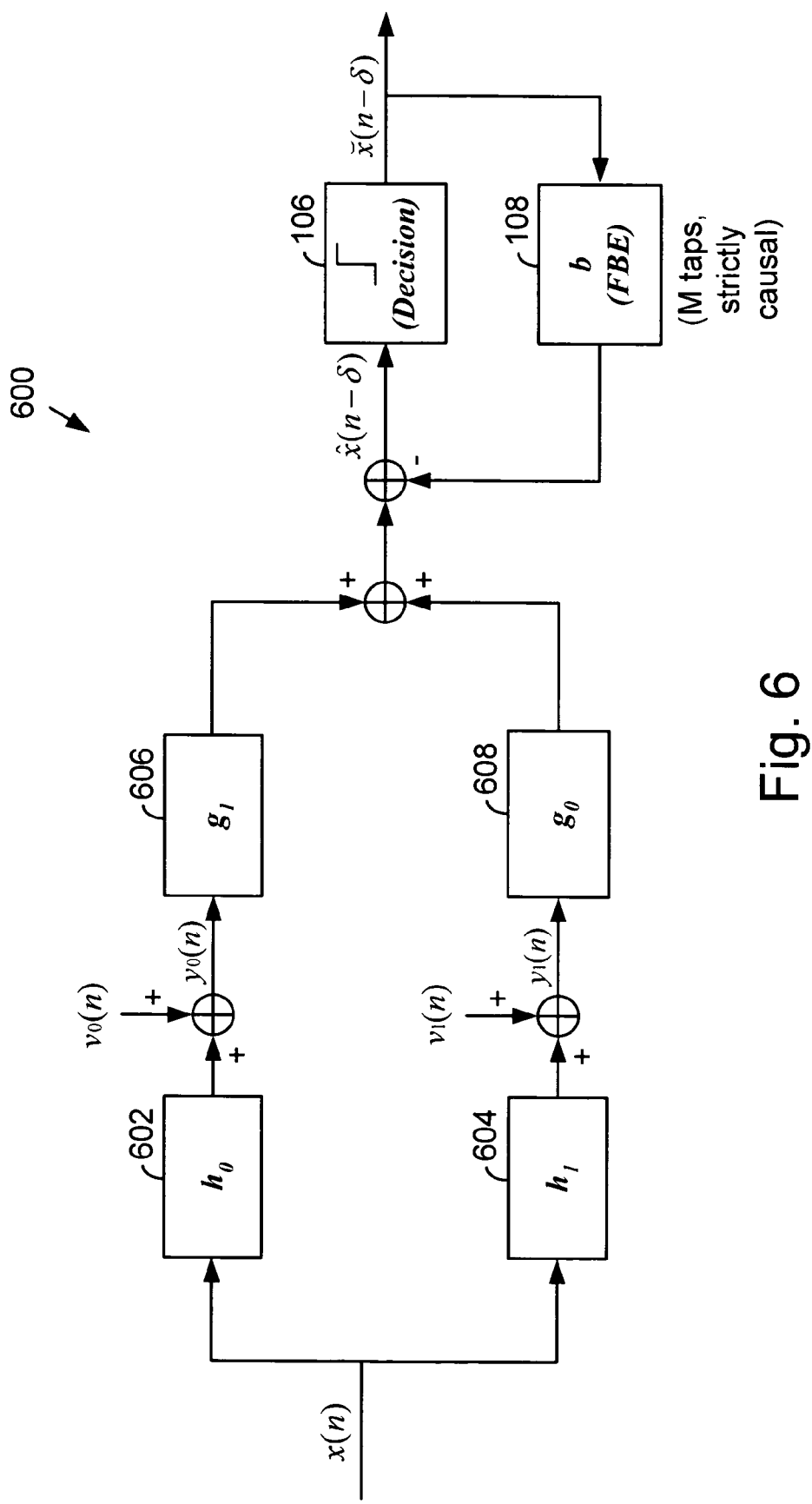
FIG. 6 is a block diagram illustrating a multi-channel equivalent of the discrete time fractionally-spaced DFE of FIG. 5.

FIG. 5 is a block diagram illustrating a discrete time fractionally-spaced DFE that operates according to the present invention. FIG. 6 is a block diagram illustrating a multi-channel equivalent of the discrete time fractionally-spaced DFE of FIG. 5. The approach used for the symbol-spaced model can be easily extended to fractionally spaced models. In this section, we shall derive a fast algorithm for a T/2-spaced equalizer. The fast solution for the general case of faster oversampling factors, say T/3, T/4, . . . , etc. will then follow simply by inspection of the arguments in this section.

FIGS. 5 and 6 illustrate two equivalent representations for a discrete time model of a T/2-spaced equalizer. FIG. 5 illustrates a DFE 500 in terms of a down sampler and up sampler device, while FIG. 6 illustrates a DFE 600 is a corresponding multichannel representation. Thus, as contrasted to FIG. 1A, the DFE 500 of FIG. 5 includes a down sampler 502 and an up sampler 504 that alter the sampling frequency. Further, the DFE 600 of FIG. 6 includes a first channel function 602 having channel estimate $h_0$ and corresponding noise function $v_0(n)$ and FFE 606 coefficients $g_0$. Likewise, the DFE 600 of FIG. 6 also includes a second channel function 604 having channel estimate $h_1$ and corresponding noise function $v_1(n)$ and FFE 608 coefficients $\{g_0, g_1\}$.

The equivalence between the structures of FIG. 5 and FIG. 6 can be easily verified by writing each of the quantities {h,g} and v(n) in terms of their polyphase components, and interchanging their position with the down sampler and the up sampler (see, e.g., P. P. Vaidyanathan, "Multirate Systems and Filter Banks," Prentice Hall, N.J., 1993 and J. R. Treichler, I. Fijalkow, C. R. Johnson, Jr., "Fractionally spaced equalizers," IEEE Signal Processing Magazine, vol. 13, no. 3, May 1996 for details). The quantities $\{h_0, h_1\}$ and $\{g_0, g_1\}$ are the so-called polyphase components of the channel and FFEs, and are denoted by N and L size vectors $\{h_0, h_1\}$ and $\{g_0, g_1\}$ (see FIG. 6). The noise sequences $\{v_0(n), v_1(n)\}$ are also the even and odd samples of v(n), with powers $2\sigma_v^2$.

A model for the multichannel representation, just like the one for the symbol spaced case in equation (4) may be rewritten by collecting $\{g_0, g_1\}$ into a single vector g', as:

$$g' = [g_1 \ g_0]$$ Equation (47)

With the output of the multichannel system given by:

$$[y_{0,n} \ y_{1,n}]g'$$ Equation (48)

Thus, the following model of Equation (49) works for the input to g':

$$[y_{0,n} \ y_{1,n}] = x_n[H_0 \ H_1] + [v_{0,n} \ v_{1,n}]$$ Equation (49)

Where $\{H_0, H_1\}$ are the convolution matrices associated with the subchannels $\{h_0, h_1\}$. It is more convenient, however, to express the inner product in Equation (45) as a function of the original FFE coefficients vector g, by reordering the entries of g'. In this case, Equation (46) is replaced by:

$$y'_n = x_n H' + v'_n$$ Equation (50)

Where $$H' = \begin{bmatrix} h(1) & h(0) & & & & \\ h(3) & h(2) & h(1) & h(0) & & \\ \vdots & \vdots & h(3) & h(2) & & \\ h(2N-1) & h(2N-2) & \vdots & \vdots & \ddots & h(0) \\ & & h(2N-1) & h(2N-2) & & h(2) \\ & & & & \ddots & \vdots \\ & & & & h(2N-1) & h(2N-2) \end{bmatrix}$$ Equation (51)

Given this convolution matrix and the noise variance $\sigma_v^2$, the solution for the fractionally space problem is simply given by Equations (29) and (30), with $\{H_\delta, \overline{H}, \sigma_v^2\}$ replaced by $\{H'_{67}, \overline{H}', \sigma_v^2\}$ (similarly to the symbol-spaced case, here we assume M>N−1).

For the symbol-spaced DFE, the shift structure of $H_\delta$ implies that $k_{L,n} = k_{L+1,n-1}(1:L)$. That is, the normalized gain $k_{L,n}$ can be computed fast, by performing the order update of $k_{L,n-1}$ to $k_{L+1,n-1}$, and then retaining the first L entries of $k_{L+1,n-1}$ as $k_{L,n}$. The procedure to derive a fast recursion in the T/2-spaced case follows the same principle. The only difference here is that the data matrix $H'_\delta$ has now a double shift structure, in the sense that each row is formed by shifting two samples of the channel at a time. Thus, two successive order updates from $k_{L,n-1}$ to $k_{L+2,n-1}$ be performed and then the first L entries of $k_{L+2,n-1}$ are retained:

$$k_{L,n-1} \rightarrow k_{L+1,n-1} \rightarrow k_{L+2,n-1} \quad \text{Equation (52)}$$

So that $$k_{L,n} = k_{L+2,n-1}(1:L) \quad \text{Equation (53)}$$

In other words, the resulting algorithm is given by two consecutive forward prediction problems similar to operations (1) through (6) of Table 2 of orders L and L+1, respectively. Table 3 lists the resulting algorithm for the T/2-spaced case.

TABLE 3

Fast Transversal Computation of FFE coefficients for the T/2-spaced equalizer.

Initialization $\zeta^f_L(-1) = \zeta^f_{L+1}(-1) = 2\sigma^2_v$ $w^f_{L,-1} = w^f_{L+1,-1} = k_{L,0} = k_{L+1,0} = 0$ $\gamma_L(0) = \gamma_{L+1}(0) = 1$ For n = 0 to $\delta$ repeat operations (I) to (II):
 (I) For q = L to L + 1 repeat operations (1) to (6):

(1) $\alpha_q(n-1) = h(2n+q-L+1) - h_{n-1} w^f_{n-2}$ (2) $f_q(n-1) = \gamma_q(n-1)\alpha_q(n-1)$ (3) $k_{q+1,n-1} = \begin{bmatrix} 0 \\ k_{q,n-1} \end{bmatrix} + \frac{\alpha^*_q(n-1)}{\zeta^f_q(n-2)} \begin{bmatrix} 1 \\ -w^f_{q,n-2} \end{bmatrix}$ (4) $\zeta^f_q(n-1) = \zeta^f_q(n-2) + \alpha^*_q(n-1)f_q(n-1)$ (5) $w^f_{q,n-1} = w^f_{q,n-2} + k_{q,n-1}f_q(n-1)$ (6) $\gamma_{q+1}(n) = \gamma_q(n) \frac{\zeta^f_q(n-2)}{\zeta^f_q(n-1)}$ (II) $k_{L,n} = k_{L+1,n-1}(1:L)$
Set $g_{opt} = k_{L,\delta}\gamma_{L+2}(\delta)$ In the general case of a T/S spaced equalizer, the fast DFE tap computation is a straightforward extension of the above algorithm, where q is iterated from L to (L+S−1). However, in the fractionally spaced equalizer, the RLS problem is formulated as a multi-channel problem. In such case, a multi-channel Kalman gain is calculated for the multi-channel RLS problem and the FFE taps are determined therefrom. Note that in the expressions of Table 3, successive order updates are performed.

Now, the optimal FBE taps could now be computed as $$b_{opt} = \begin{bmatrix} I_M & 0 \end{bmatrix} F * \Lambda_S (F \otimes I_S) \begin{bmatrix} g_{opt} \\ 0 \end{bmatrix} \quad \text{Equation (54)}$$

Where $\Lambda_S$ is a block diagonal matrix, which satisfies $$C_S = F_S^* \Lambda_S F_S \quad \text{Equation (55)}$$

Where $F_S = FI_S$ and $C_S$ is a block circulant matrix, which is formed by extending the matrix H in the same manner as in Equation (42). As was the case with the symbol spaced operations described above, the convolution may be performed in a transformed domain, e.g., Frequency Transformation domain, Discrete Cosine Transformation domain and the Discrete Hadamard Transformation domain, among others. In such case a Croniker product may be employed in conjunction with such domain transformation in performing multi-channel convolution in the selected transformed domain.

Figure 7:
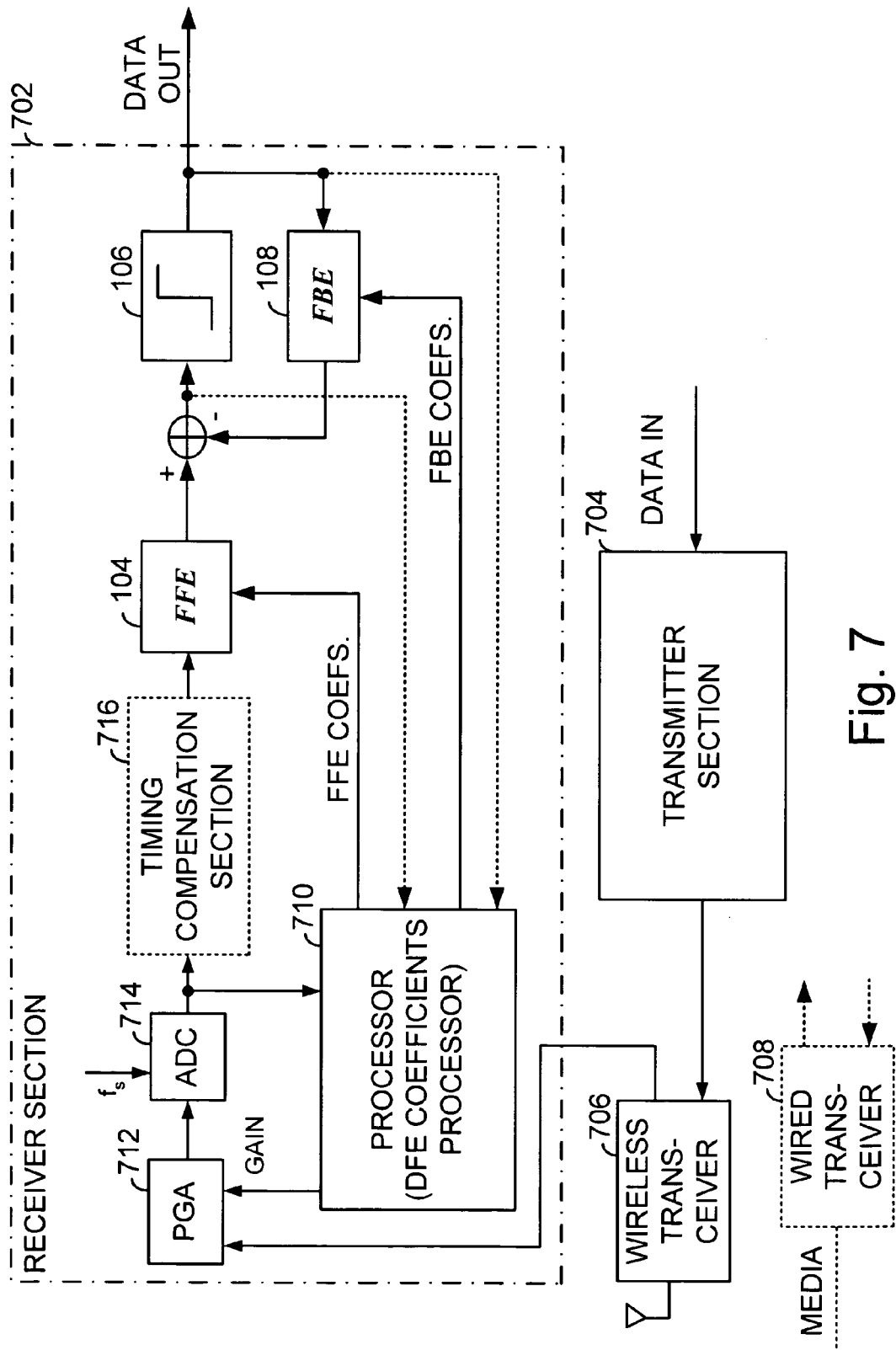
FIG. 7 is a block diagram illustrating a transceiver having a DFE constructed according to the present invention.

FIG. 7 is a block diagram illustrating a transceiver constructed according to the present invention. The components of the transceiver 700 are resident in a communications device and are illustrated only generally to show how the operations of the present invention would be accomplished in such a transceiver. The transceiver 700 includes a receiver section 702 and a transmitter section 704 and further includes either a wireless transceiver 706 or a wired transceiver, depending upon the system in which the transceiver 700 is implemented. In the case of a cellular device, RF device, satellite system device, or another wireless implementation, the transceiver 700 includes a wireless transceiver. However, in the case of a cable modem, a LAN device, a home networking device, or another device that couples to a physical media, the transceiver 700 includes a wired transceiver 708. Further, if the present invention is implemented in a Serializer/Deserializer (SERDES) or similar application, the receiver section 702 and transmitter section 704 may couple to a media without a wired transceiver 708.

Further discussion of the transmitter section 704 and receiver section 702 are in the context of baseband processing. In such case, the receiver section 702 receives a baseband signal from the wireless transceiver 706 (or wired transceiver 708) that is baseband modulated and operates upon the baseband signal to extract data. These operations include determining DFE coefficients according to the present invention and operating upon the baseband signal using the determined DFE coefficients.

The transmitter section 704 receives digital data to be transmitted from a host, codes the digital data into a baseband signal, and passes the baseband signal to the RF transceiver 706. The RF transceiver 706 couples the baseband signal to an RF carrier to create an RF signal and transmits the RF signal to a receiving device across a wireless link.

The receiver section 702 receives a baseband signal that carries coded data from the RF transceiver 706. A Programmable Gain Amplifier (PGA) 712 adjusts the gain of the baseband signal and then provides the gain-adjusted baseband signal to an Analog-to-Digital Converter (ADC) 714 for sampling. The ADC 208 samples the gain adjusted baseband signal at a particular sampling frequency, $f_s$ (that is the symbol clock frequency), to produce samples thereof.

A processor 710 couples to the output of the ADC 714 and analyzes a preamble sequence contained in each received physical layer frame. Based upon the preamble sequence, the processor 710 determines a gain to be applied to portions of the baseband signal corresponding to the data carrying portions of the frame and provides this gain to the PGA 712. Further, the processor 710 may also interact with the optional timing compensation section 716 to compensate for symbol timing and RF carrier mismatches.

The processor 710, based upon the preamble sequence (and based upon actual extracted data in some operations), also determines FFE 104 and FBE 108 coefficients. The manner in which these coefficients are determined was previously described in detail herein. Further, and as was also previously described, the processor 710 may estimate a channel and calculate DFE coefficients based upon unknown but assumed data content. After the processor 710 determines these coefficients, they are applied to the FFE 104 and FBE 108 for subsequent use in extracting data from the baseband signal.

The structure described in FIG. 7 may be embodied using various types of circuits formed using various manufacturing processes. For example, in one particular embodiment, the RF transceiver 706 (or wired transceiver 708) is embodied in a first integrated circuit that is coupled to a second integrated circuit that includes the transmitter section 704 and the receiver section 702, among other circuits. In another embodiment, the RF transceiver 706, the transmitter section 704 and the receiver section 702 are all formed on a single monolithic integrated circuit. These integrated circuits may be constructed in CMOS or another semiconductor technology, e.g., PMOS, NMOS, Bipolar, etc.

Further, the receiver section 702 of FIG. 7 may be constructed using various circuit elements/combinations. In one embodiment, all structures past the ADC 714 in the receiver section 702 are embodied using a Digital Signal Processor (DSP) or similar processing device. In another embodiment, dedicated signal path circuitry embodies each of the structural components of the receiver section 702, including the processor 710. While a DSP implementation would provide more flexibility, dedicated signal path circuitry would typically provide higher performance at a lower cost and with lower power consumption.

Figure 8:
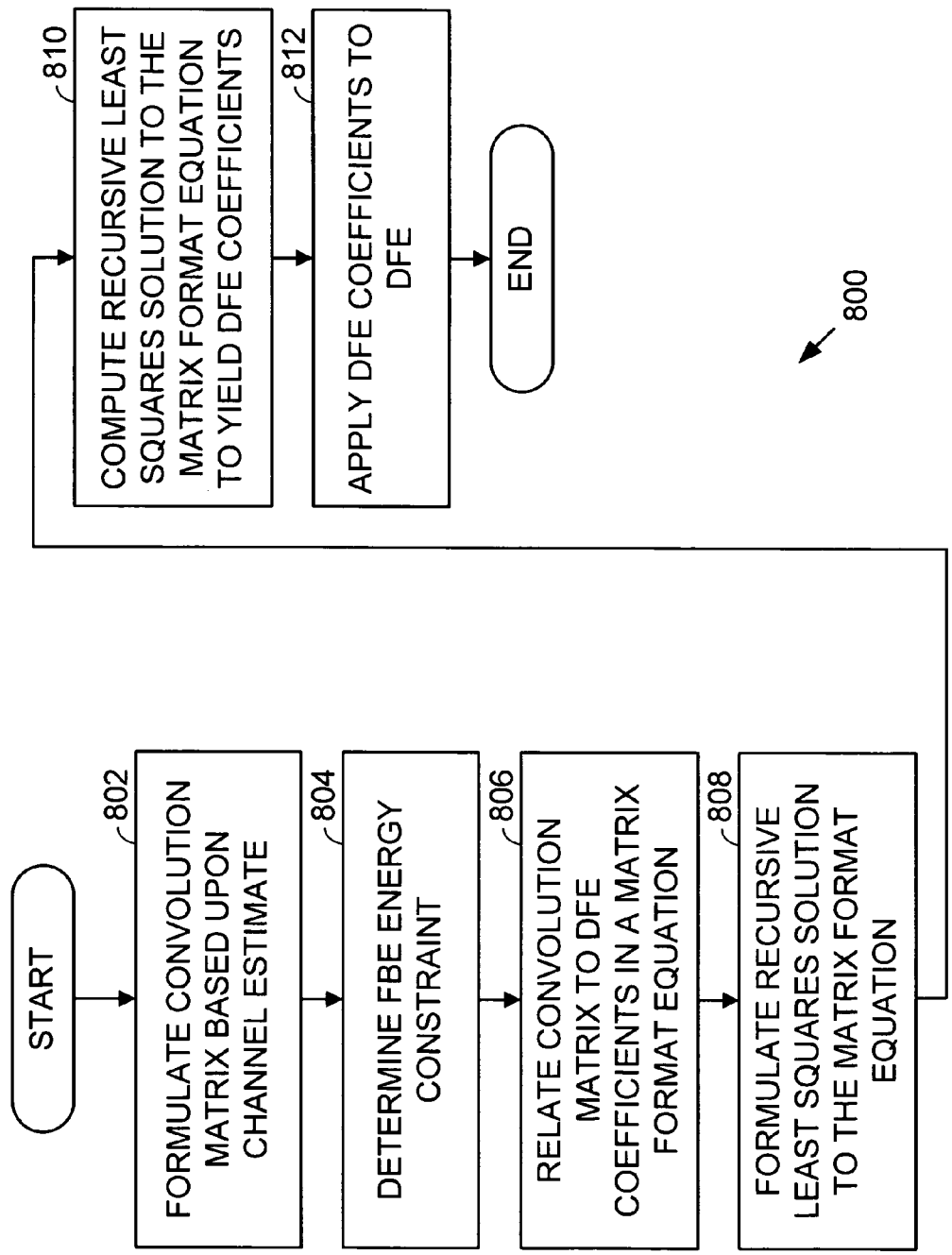
FIG. 8 is a logic diagram illustrating operations according to the present invention employed to determine DFE coefficients with constrained FBE energy.

FIG. 8 is a logic diagram illustrating operations according to the present invention employed to determine DFE coefficients with constrained FBE energy. With these operations, a DFE solution is determined that facilitates a trade off between noise enhancement and error propagation. Operation commences with formulating the channel estimate as a convolution matrix H (step 802). Operation continues with determining a FBE energy constraint based upon the channel estimate (step 804). Operation continues with relating the convolution matrix H to the DFE coefficients in a matrix format equation, the matrix format equation based upon the structure of the DFE, the convolution matrix, an expected output of the DFE, and the FBE energy constraint (step 806). The operation continues with formulating a recursive least squares solution to the matrix format equation (step 808). Operation further includes computing the recursive least squares solution to the matrix format equation to yield the DFE coefficients. (step 810). Operation completes with applying the DFE coefficients to the DFE (step 812). The operations of FIG. 8 may replace steps 204-208 of FIG. 2 with the other operations of FIG. 2 being additionally performed. The transceiver of FIG. 7 may be employed to implement the operations of FIG. 7. In such case, the processor 710 would have primary or all responsibility in determining the DFE coefficients.

The operations in determining the FBE energy constraint that is based upon the channel estimate at step 804 may include: (1) estimating a channel profile of the channel estimate; (2) estimating a Signal to Noise Ratio (SNR) of the channel estimate; (3) comparing the SNR of the channel estimate to an operational SNR to determine a noise characterization of the channel estimate; and (4) determining the FBE energy constraint based upon the noise characterization of the channel estimate and the channel profile of the channel estimate. The FBE energy constraint may be formulated as a diagonal matrix having a plurality of FBE energy constraint coefficients.

The Constrained Energy DFE (CE-DFE) solution may be given in Equation (56) as:

$$\min_{g,b}(E|x(n-\delta) - \hat{x}(n-\delta)|^2 + b^*Gb) \quad \text{Equation (56)}$$

Where G is a weighting diagonal matrix (FBE energy constraint) given by:

$$G = \text{diag}[\alpha_1 \alpha_2 \ldots \alpha_M] \quad \text{Equation (57)}$$

By collecting f and b into a single vector w, the minimization of equation (56) can be written as:

$$\min_w E \left| x_n - [y_n \ \check{x}_n] \begin{bmatrix} g \\ b \end{bmatrix} \right|^2 + w^* \begin{bmatrix} 0 & 0 \\ 0 & G \end{bmatrix} w. \quad \text{Equation (58)}$$

The CE-DFE solution is thus given in Equation (59) as:

$$w_{opt} = \left( R_u + \begin{bmatrix} 0 & 0 \\ 0 & G \end{bmatrix} \right)^{-1} R_{ux(n-\delta)}, \quad \text{Equation (59)}$$

Using the channel output model of Equation (4), the CE-DFE solution becomes:

$$w_{opt} = \begin{bmatrix} \sigma_v^2 I + H^*H & -\overline{H}^* \\ -\overline{H} & D \end{bmatrix} \begin{bmatrix} h^* \\ 0 \end{bmatrix}, \quad \text{Equation (60)}$$

where the diagonal matrix D is defined by:

$$D = I + G = \text{diag}[(1+\alpha_1)(1+\alpha_2) \ldots (1+\alpha_M)] \quad \text{Equation (61)}$$

Applying the inverse formula of block matrices yields:

$$w_{opt} = \left( \begin{bmatrix} 0 & 0 \\ 0 & D^{-1} \end{bmatrix} + \begin{bmatrix} I \\ D^{-1}\overline{H} \end{bmatrix} \right. \quad \text{Equation (62)}$$

$$\left. (\sigma_v^2 I + H^*H - \overline{H}^* D^{-1} \overline{H})^{-1} [I \ D^{-1}\overline{H}] \right) \begin{bmatrix} h^* \\ 0 \end{bmatrix},$$

$$= \begin{bmatrix} I \\ D^{-1}\overline{H} \end{bmatrix} (\sigma_v^2 I + H^*H - \overline{H}^* D^{-1} \overline{H})^{-1} h^*. \quad \text{Equation (63)}$$

Thus, in one embodiment, the matrix format equation (determined at step 806) may be written as Equations (64) and (65) as:

$$g_{opt} = (\sigma_v^2 I + H^*H - \overline{H}^* D^{-1} \overline{H})^{-1} h^* \quad \text{Equation (64)}$$

$$b_{opt} = D^{-1} \overline{H} g_{opt} \quad \text{Equation (65)}$$

Solving Equations (64) and (65) to yield the DFE coefficients as performed at steps 808 and 810 may be performed in a manner similar to the operations described with reference to FIGS. 3 and 4. In such case, computing the recursive least squares solution to the matrix format equation to yield the DFE coefficients may include computing a solution to the least squares problem that yields Feed Forward Equalizer (FFE) coefficients of the DFE coefficients. This technique would also include convolving the FFE coefficients with a convolution matrix that is based upon the channel estimate to yield the FBE coefficients of the DFE coefficients.

Using techniques similar to those describe with reference to FIGS. 3 and 4, formulating the recursive least squares solution to the matrix format equation may include using a Fast Transversal Filter (FTF) algorithm or formulating as a Kalman gain solution using the FTF algorithm. In such case, the Kalman gain solution may be determined using an Array Form Algorithm According to one embodiment of the present invention, the plurality of FBE energy constraint coefficients is equal valued. Such equal tap weighting is given by Equation (66):

$$\alpha_1 = \alpha_2 = \ldots = \alpha_M = \alpha, \quad \text{Equation (66)}$$

With this equal valued embodiment, the CE-DFE solution reduces to:

$$g_{opt} = \left(\sigma_v^2 I + H^* H - \frac{1}{1+\alpha} \overline{H}^* \overline{H}\right)^{-1} h^* \quad \text{Equation (67)}$$

$$b_{opt} = \frac{1}{1+\alpha} \overline{H} g_{opt} \quad \text{Equation (68)}$$

The CE-DFE solution is a trade off between the conventional DFE solution given in equations (29) and (30) and the conventional LE solution given in equation (11). In other words, the CE-DFE solution is a trade off between noise enhancement and error propagation. Thus, two special cases of solution to Equations (67) and (68) exist. The first case is for the zero FBE energy constraint. The second case is for the infinite FBE energy constraint.

For the zero FBE energy constraint:

$$\alpha_i = 0, \text{ for all } i \quad \text{Equation (69)}$$

With this assumption, the matrix D reduces to:

$$D = I, \quad \text{Equation (70)}$$

and the CE-DFE solution directly reduces to the DFE solution given in Equations (29) and (30).

For the infinite FBE energy constraint:

$$\alpha_i \to \infty, \text{ for all } i \quad \text{Equation (71)}$$

With this assumption, the matrix D reduces to:

$$\lim_{\alpha_i \to \infty} D = 0 \quad \text{Equation (72)}$$

In this case, the CE-DFE solution approaches the LE solution given in Equation (11).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for directly computing Decision Feedback Equalizer (DFE) coefficients from a channel estimate, the method comprising:
   formulating the channel estimate as a convolution matrix H;
   determining a Feed Back Equalizer (FBE) energy constraint based upon the channel estimate;
   relating the convolution matrix H to the DFE coefficients in a matrix format equation, the matrix format equation based upon the structure of the DFE, the convolution matrix, an expected output of the DFE, and the FBE energy constraint;
   formulating a recursive least squares solution to the matrix format equation; and
   computing the recursive least squares solution to the matrix format equation to yield the DFE coefficients.

2. The method of claim 1, wherein determining the FBE energy constraint based upon the channel estimate comprises:
   estimating a channel profile of the channel estimate;
   estimating a Signal to Noise Ratio (SNR) of the channel estimate;
   comparing the SNR of the channel estimate to an operational SNR to determine a noise characterization of the channel estimate; and
   determining the FBE energy constraint based upon the noise characterization of the channel estimate and the channel profile of the channel estimate.

3. The method of claim 1, wherein the FBE energy constraint is formulated as a diagonal matrix having a plurality of FBE energy constraint coefficients.

4. The method of claim 3, wherein the plurality of FBE energy constraint coefficients is equal valued.

5. The method of claim 3, wherein the plurality of FBE energy constraint coefficients is not equal valued.

6. The method of claim 1, wherein computing the recursive least squares solution to the matrix format equation to yield the DFE coefficients comprises:
   computing a solution to the least squares problem that yields Feed Forward Equalizer (FFE) coefficients of the DFE coefficients; and
   convolving the FFE coefficients with a convolution matrix that is based upon the channel estimate to yield the FBE coefficients of the DFE coefficients.

7. The method of claim 1, wherein formulating the recursive least squares solution to the matrix format equation includes using a Fast Transversal Filter (FTF) algorithm.

8. The method of claim 1, wherein the recursive least squares solution is formulated as a Kalman gain solution using a Fast Transversal Filter (FTF) algorithm.

9. The method of claim 8, wherein the Kalman gain solution is determined using an Array Form Algorithm.

10. The method of claim 1, wherein the DFE services at least one of a receiver used in a High Definition Television, a receiver used in a Wireless Local Area Network, and a receiver used in a Cellular Telephone.

11. A Decision Feedback Equalizer system comprising:
    a Decision Feedback Equalizer (DFE) having an input that receives an uncompensated signal and operates upon the uncompensated input using DFE coefficients to produce an equalized output; and
    a DFE coefficients processor that is operable to:
       formulate a channel estimate as a convolution matrix H;

determine a Feed Back Equalizer (FBE) energy constraint based upon the channel estimate;

relate the convolution matrix H to the DFE coefficients in a matrix format equation, the matrix format equation based upon the structure of the DFE, the convolution matrix, an expected output of the DFE, and the FBE energy constraint;

formulate a recursive least squares solution to the matrix format equation; and compute the recursive least squares solution to the matrix format equation to yield the DFE coefficients.

12. The Decision Feedback Equalizer system of claim 11, wherein in determining the FBE energy constraint based upon the channel estimate, the DFE coefficients processor is operable to:

estimate a channel profile of the channel estimate;

estimate a Signal to Noise Ratio (SNR) of the channel estimate;

compare the SNR of the channel estimate to an operational SNR to determine a noise characterization of the channel estimate; and determine the FBE energy constraint based upon the noise characterization of the channel and the channel profile of the channel estimate.

13. The Decision Feedback Equalizer system of claim 12, wherein the DFE coefficients processor is operable to formulate the FBE energy constraint as a diagonal matrix having a plurality of FBE energy constraint coefficients.

14. The Decision Feedback Equalizer system of claim 13, wherein the plurality of FBE energy constraint coefficients is equal valued.

15. The Decision Feedback Equalizer system of claim 13, wherein the plurality of FBE energy constraint coefficients is not equal valued.

16. The Decision Feedback Equalizer system of claim 11, wherein the DFE coefficients processor is operable to compute the recursive least squares solution to the matrix format equation to yield the DFE coefficients by:

computing a solution to the least squares problem that yields Feed Forward Equalizer (FFE) coefficients of the DFE coefficients; and convolving the FFE coefficients with a convolution matrix that is based upon the channel estimate to yield the FBE coefficients of the DFE coefficients.

17. The Decision Feedback Equalizer system of claim 11, wherein the DFE coefficients processor is operable to formulate the recursive least squares solution to the matrix format equation using a Fast Transversal Filter (FTF) algorithm.

18. The Decision Feedback Equalizer system of claim 11, wherein the DFE coefficients processor is operable to formulate the recursive least squares solution to the matrix format equation as a Kalman gain solution using a Fast Transversal Filter (FTF) algorithm.

19. The Decision Feedback Equalizer system of claim 18, wherein the DFE coefficients processor is operable to formulate the Kalman gain solution using an Array Form Algorithm.

20. The Decision Feedback Equalizer system of claim 11, wherein the DFE is operable to service at least one of a receiver used in a High Definition Television, a receiver used in a Wireless Local Area Network, and a receiver used in a Cellular Telephone.

* * * * *